United States Patent
Lauridsen et al.

(10) Patent No.: US 7,940,917 B2
(45) Date of Patent: May 10, 2011

(54) MANAGING RECEIVED CALLS

(75) Inventors: Christina Karen Lauridsen, Austin, TX (US); Sushma Bharat Patel, Austin, TX (US); Loulwa F. Salem, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/626,641

(22) Filed: Jan. 24, 2007

(65) Prior Publication Data
US 2008/0175374 A1 Jul. 24, 2008

(51) Int. Cl.
*H04M 3/00* (2006.01)
(52) U.S. Cl. ............ 379/266.01; 379/265.14; 379/266.1
(58) Field of Classification Search ... 379/265.01–266.1
See application file for complete search history.

(56) References Cited

U.S. PATENT DOCUMENTS

| | | | |
|---|---|---|---|
| 5,537,470 A * | 7/1996 | Lee | 379/265.11 |
| 5,646,988 A | 7/1997 | Hikawa | |
| 6,002,760 A * | 12/1999 | Gisby | 379/266.01 |
| 6,141,328 A * | 10/2000 | Nabkel et al. | 370/259 |
| 6,975,720 B1 | 12/2005 | Crook | |
| 7,016,479 B2 | 3/2006 | Flathers et al. | |
| 7,068,775 B1 | 6/2006 | Lee | |

* cited by examiner

*Primary Examiner* — Simon Sing
(74) *Attorney, Agent, or Firm* — Yee & Associates, P.C.; Steven L. Bennett

(57) ABSTRACT

A method, apparatus, and computer usable program product for managing received calls. In response to receiving a first call from a user, the process stores a record of the first call in a table of received calls. Thereafter, in response to receiving a second call from the user within a predefined period of time after the first call was prematurely disconnected, the process identifies a second call as a prematurely terminated call. The process then places the prematurely terminated call in a queue of calls according to a set of configurable criteria and updates the record of the first call with a progress of the prematurely terminated call.

12 Claims, 3 Drawing Sheets

MANAGING RECEIVED CALLS

BACKGROUND OF THE INVENTION

1. Field of the Invention

The present invention relates generally to an improved data processing system, and, in particular, to a method and apparatus for managing received calls. Still more particularly, the present invention is related to a computer implemented method, an apparatus, and a computer usable program product for automatic prioritization of received calls.

2. Description of the Related Art

Automated telephone systems present a convenient means to direct a caller to an operator who is most capable of assisting the caller. These automated telephone systems are implemented to maximize an operator's efficiency by directing only relevant calls to the operator and by minimizing the amount of idle time between callers.

Idle time refers to the period of time when an operator is waiting to assist a caller. Idle time between callers is minimized by requiring the callers to wait in a call queue so that once the operator has spoken with one caller, the operator can proceed immediately to the next caller in the queue. However, use of automated telephone systems often requires a caller to spend substantial amounts of time navigating a pre-recorded audio menu utilizing telephone buttons to select menu options and waiting in the call queue to speak with an operator.

In some instances, the caller may be prematurely disconnected from the automated telephone system after having spent a substantial amount of time navigating the different menu options and waiting in the call queue to speak with an operator. Once disconnected, the caller is often required to call back and to repeat the entire process of navigating menu options and waiting again at the back of the call queue in order to speak with an operator. The caller is required to invest even more time than usual to complete the desired transaction which causes understandable frustration and caller dissatisfaction.

A call may be prematurely disconnected because the caller or operator purposefully or inadvertently hangs up before the call is complete. Additionally, a call can be prematurely disconnected because a caller using a cellular telephone, for example, travels outside a service area, drives a car through a tunnel, if the network simply drops the call, interference results in a distorted reception, a battery operated phone runs out of power, a glitch in the automated telephone system disconnects the caller, or any other occurrence that may cause premature termination of the call.

One currently used method for addressing this problem involves the use of a call center that stores an identifier of a caller in a database. The call center uses the identifier, which may be a phone number or other unique number, in order to maintain the caller's position in a queue without actually requiring the caller to remain on the phone. Thereafter, if the first call is prematurely disconnected, then the caller can call back and reassume the position in the call queue so long as the caller calls back within a certain time frame.

In another currently used method, a caller who is prematurely disconnected from an automated telephone system can be directed back to a specific agent after an original call is purposefully or inadvertently disconnected. In this method, the caller and agent can be reconnected by referencing a call record containing a unique caller identifier, such as a telephone number, and a unique operator identifier, such as an employee identification number.

However, current solutions do not facilitate the detection of errors in the automated telephone system or identify potentially problematic operators that may be the cause of the prematurely disconnected calls.

SUMMARY OF THE INVENTION

The illustrative embodiments described herein provide a computer implemented method, apparatus, and computer usable program product for managing received calls. In response to receiving a first call from a user, the process stores a record of the first call in a table of received calls. Thereafter, in response to receiving a second call from the user within a predefined period of time after the first call was prematurely disconnected, the process identifies a second call as a prematurely terminated call. The process then places the prematurely terminated call in a queue of calls according to a set of configurable criteria and updates the record of the first call with a progress of the prematurely terminated call.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
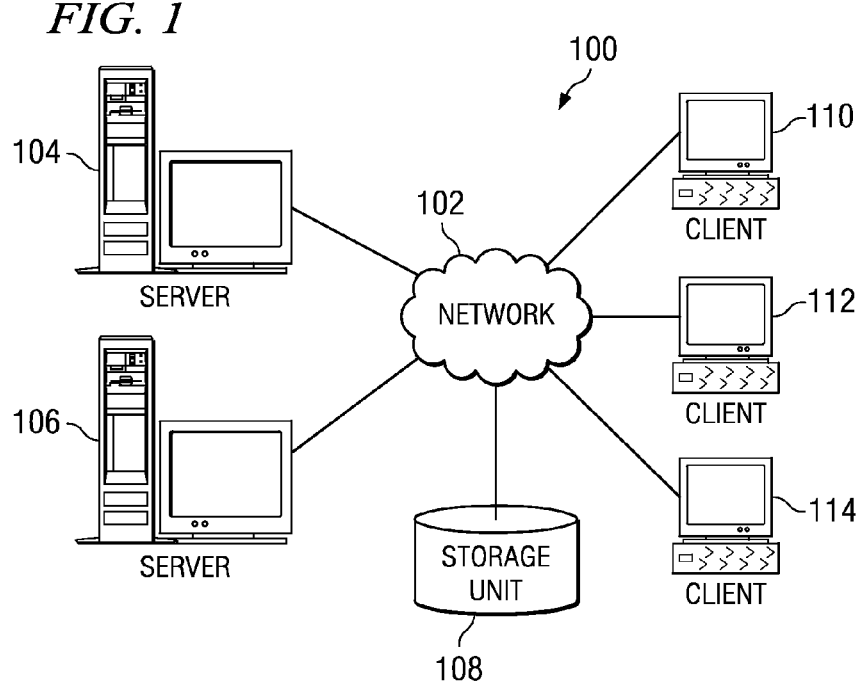
FIG. 1 is a pictorial representation of a network data processing system in which illustrative embodiments may be implemented.
Figure 2:
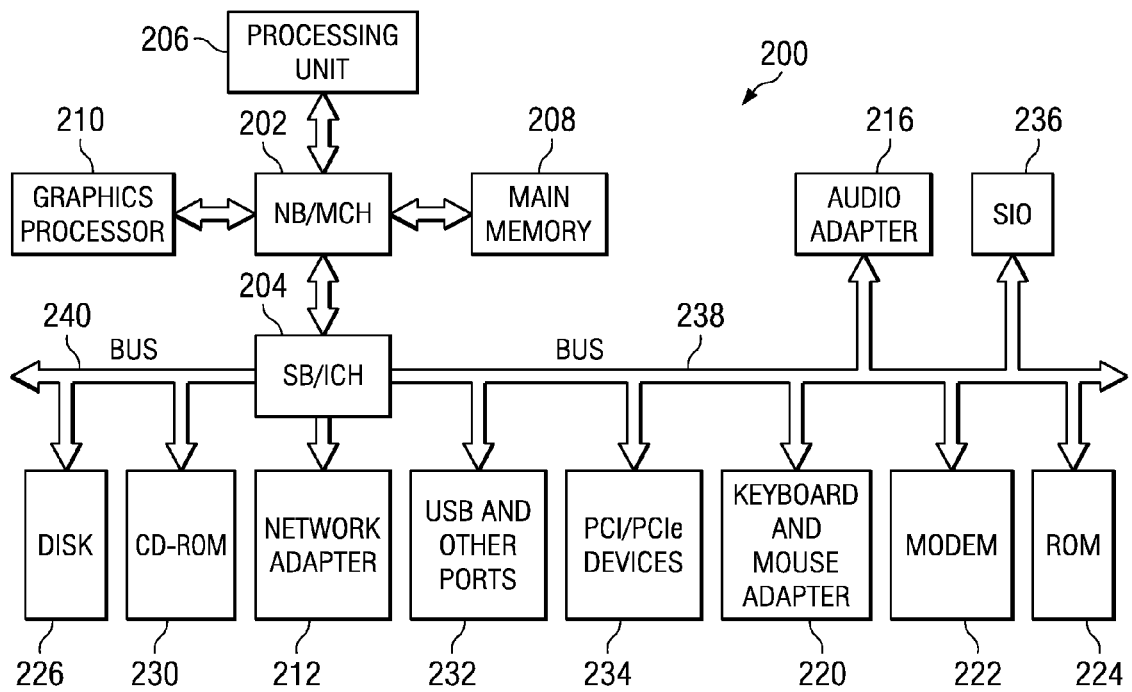
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computing devices in which embodiments may be implemented. Network data processing system 100 contains network 102, which is the medium used to provide communication links between various devices and computers connected together within network data processing system 100. Network 102 may include connections, such as wire, wireless communication links, or fiber optic cables. The depicted example in FIG. 1 is not meant to imply architectural limitations. For example, data processing system 100 also may be a network of telephone subscribers and users.

In the depicted example, server 104 and server 106 connect to network 102 along with storage unit 108. In addition, clients 110, 112, and 114 are coupled to network 102. Clients 110, 112, and 114 are examples of devices that may be utilized for transmitting or receiving audio-based communication in a network, such as network 102. Clients 110, 112, and 114 may be, for example, a personal computer, a laptop, a tablet PC, a network computer, a hardwired telephone, a cellular phone, a voice over internet communication device, or any other communication device or computing device capable of transmitting data. In the depicted example, server 104 provides data, such as boot files, operating system images, and applications to clients 110, 112, and 114. Clients 110, 112, and 114 are coupled to server 104 in this example. Network data processing system 100 may include additional servers, clients, computing devices, and other devices for transmitting or receiving audio-based communication.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), a wide area network (WAN), a telephone network, or a satellite network. FIG. 1 is intended as an example, and not as an architectural limitation for different embodiments.

With reference now to FIG. 2, a block diagram of a data processing system is shown in which illustrative embodiments may be implemented. Data processing system 200 is an example of a computing device, such as server 104 and clients 110, 112, and 114 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object-oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, a laptop computer, or a telephone device in addition to taking the form of a PDA.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

The illustrative embodiments described herein provide a computer implemented method, apparatus, and computer usable program product for managing calls. In response to receiving a first call from a user, the process stores a record of the first call in a table of received calls. Thereafter, in response to receiving a second call from the user within a predefined period of time after the first call was prematurely disconnected, the process identifies a second call as a prematurely terminated call. The process then places the prematurely terminated call in a queue of calls according to a set of configurable criteria and updates the record of the first call with a progress of the prematurely terminated call.

A set of configurable criteria is one or more rules or instructions that direct the manner in which a prematurely terminated call is placed back into a call queue. In addition, a first call is call received prior to the receipt of the second call. Thus, for example, in the event that a caller has called an automated telephone system in excess of two times, the second call may be the last call in a series of calls, whereas the first call may be any call received prior to the last call.

The record of the call contains one or more identifiers to allow the process to identify and monitor the progress of a prematurely terminated call. The progress of a prematurely terminated call can be thought of as a history of the user's progression through an automated telephone system. Thus, monitoring the progress of the prematurely terminated call may include, for example, keeping a record of the various operators or stages through which a user has proceeded through. A stage can be, for example, one part of a multi-part transaction that occurs via communication by a caller over a telephone. Upon completing one part of the transaction, the caller can proceed to the subsequent stage of the transaction. In addition, a stage can be a department or division within an organization, such as a "new accounts department" or a "billing department" to which a caller has been directed in response to selecting a pre-recorded menu option from an automated telephone system.

Additionally, the process can be configured to assign a priority ranking value to the call record of the first, prematurely disconnected call. Subsequently, the process is able to reference the priority ranking value, along with a record of the progress of the first call in order to place a second call from the user in a selected position within the call queue in which the user was located at the time the first call was prematurely disconnected.

Figure 3:
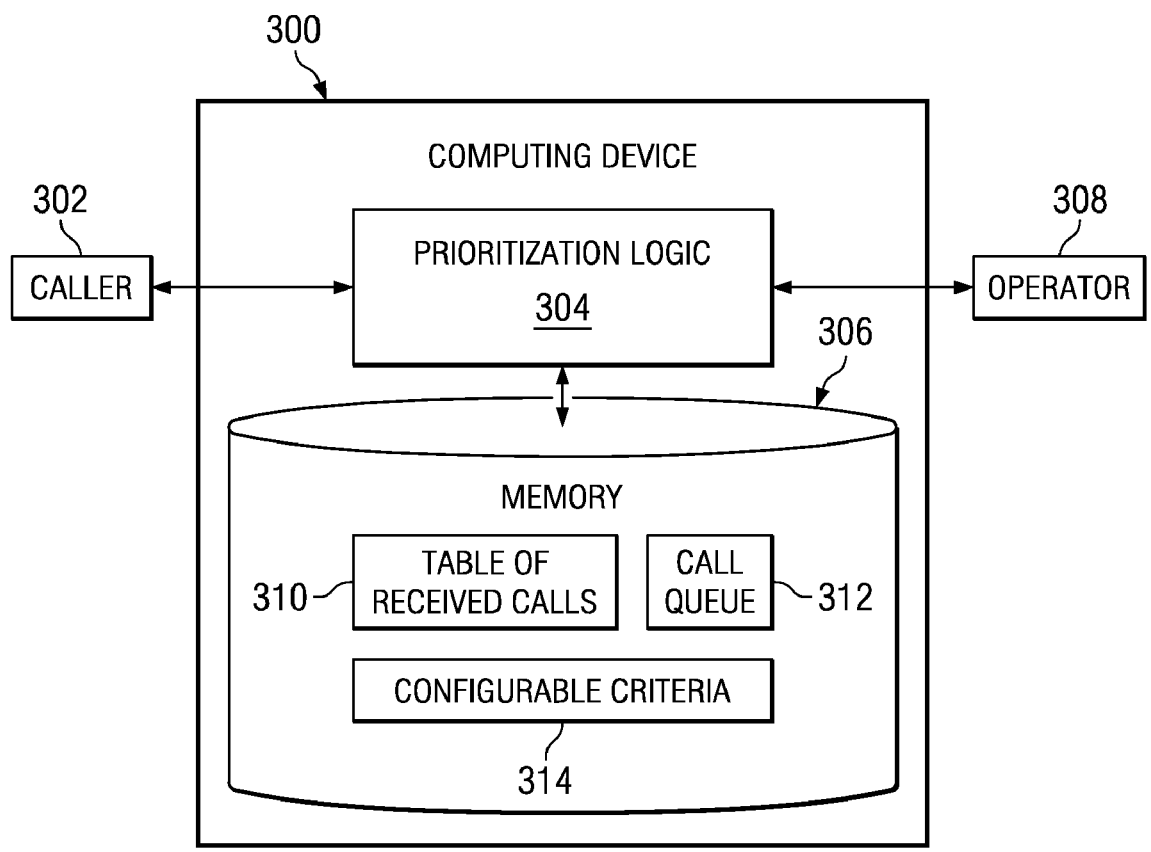
FIG. 3 is a block diagram of a flow of data through components of a data processing system for prioritizing a call in accordance with an illustrative embodiment.

Turning now to FIG. 3, a block diagram of the flow of data through components of a data processing system for prioritizing a call is depicted in accordance with an illustrative embodiment. In this illustrative embodiment of FIG. 3, computing device 300 can be, for example, a component of an automated telephone system. The automated telephone system may be a network data processing system, such as network data processing system 100 of FIG. 1. In particular, computing device 300 may be a computing device, such as clients 110, 112, or 114 of FIG. 1.

Computing device 300 is any device or system capable of being used in the automated telephone system and usable to manage received calls from one or more callers, such as caller 302. Caller 302 may be, for example, a customer seeking the services of a company utilizing an automated telephone system. Computing device 300 manages calls by implementing prioritization logic 304 and memory 306 in order to direct caller 302 to speak with operator 308, who may be, for example, a customer service representative.

Prioritization logic 304 is a software component programmable to manage received calls. Prioritization logic 304 can be implemented in any programming language known or available, including but not limited to C++, Cobol, Java, and Fortran. In alternative embodiments, prioritization logic 304 may be a hardware component, or a combination of software and hardware. Prioritization logic 304 manages received calls by creating a call record for each call that is received by the automated telephone system.

Call records are stored in memory 306. Prioritization logic 304 compares each newly received call with the stored call records to identify a prematurely terminated call. A prematurely terminated call is a second call received from a caller who had placed a first call that was prematurely disconnected. If prioritization logic 304 matches the newly received call with a call record in table of received calls 310, then the newly received call is deemed a prematurely terminated call. In one embodiment, prioritization logic 304 may match the phone number of the newly received call with the phone number stored in the record of the first call. In alternate embodiments, prioritization logic 304 may be configured to match a newly received call with a pre-existing call record based upon any unique identifier, such as, for example, the caller's social security number or an alphanumeric customer identification number selected by the caller or assigned to the caller by the automated telephone system. In this manner, a prematurely terminated call can be identified even if a caller places the second call from a different phone than the first call, as in the instance where the first call is placed from a cellular telephone and the second call is placed from a wired telephone because the battery on the cellular phone ran out.

Upon identifying a prematurely terminated call, prioritization logic 304 can direct a second call received from a caller to a proper destination after the caller's first call was prematurely disconnected. The call records contain information such as, for example, information establishing the identity of the caller and the phone number of the phone from which the caller placed the call. The call record may also contain any other information that may indicate, for example, which call queue a caller was waiting in, or which operator the caller was speaking with when the first call was prematurely disconnected.

Memory 306 includes table of received calls 310, call queue 312, and configurable criteria 314. Memory 306 may be implemented in any type of known or available memory, including, but not limited to, main memory, random access memory (RAM), read only memory (ROM), non-volatile random access memory (NV-RAM), a hard disk, a secondary storage device, or any other type of memory.

In one embodiment, table of received calls 310 stores one call record for each phone call received from a unique caller. Table of received calls 310 can be a database, a spreadsheet, a table, or a list of call records, each of which is created from the receipt of a call from a caller, such as caller 302. Thus, if caller 302 is the only caller to the automated telephone system implementing computing device 300, then table of received calls 310 contains only one call record for the call from caller 302.

Call queue 312 is a queue of callers waiting to speak with operator 308. In one embodiment, operator 308 speaks with each caller in call queue 312 according to the order in which the callers are listed in call queue 312. However, the order in which the callers are placed into call queue 312 may depend upon a number of different factors. In the simplest example, the callers are placed in call queue 312 based upon the order in which a call from each caller was received by the automated telephone system. Thus, the first caller to call would be the first person to speak with operator 308, whereas the last caller to call would be the last person to speak with operator 308. In alternative embodiments, the order in which callers are placed into call queue 312 may also be determined by other factors, such as whether the caller is a preferred customer, the stage of a particular transaction the caller was completing, or the fact that a subsequent caller had been previously prematurely disconnected from the automated telephone system after having already waited in call queue 312. These factors may be predefined by an automated telephone system administrator (not shown) and set forth in configurable criteria 314 for reference by prioritization logic 304 in order to place the callers in call queue 312.

Prioritization logic 304 may place a caller at the end of call queue 312, or in some advanced position within call queue 312 if a call record exists for the caller in which the call record directs prioritization logic 304 to assign a received call a higher priority ranking value than the other calls currently in call queue 312. Prioritization logic 304 may assign the higher priority based upon configurable criteria 314. Configurable criteria 314 is a set of one or more rules or instructions that directs the manner in which prioritization logic 304 places a prematurely terminated call back into call queue 312.

Once a prematurely terminated call is identified, prioritization logic 304 may place the prematurely terminated call into an advanced position within call queue 312, rather than at the end of call queue 312. The position within call queue 312 in which the prematurely terminated call is placed may depend upon different factors. One is example is a priority ranking value. In one embodiment, the priority ranking value may be a numerical value assigned to each call record where higher values indicate a greater priority and thus result in a more advanced position in a call queue. In another embodiment, the priority ranking value may be a designation such as "high", "medium", or "low". With this example, a designation of "high" results in the placement of the call in a more advanced position in a call queue, and a designation of "low" may result in the call not being given any special consideration.

The priority ranking value may be generated based upon the rules defined by configurable criteria 314. For example, in one illustrative embodiment, configurable criteria 314 may include a rule for assigning a priority ranking value to a call in a call record based upon the length of a previous call. For instance, a caller who has been waiting for an operator in call queue 312 for an hour may be given the highest priority ranking value if, for example, the current wait time for operator 308 in call queue 312 is less than an hour. Thus, when caller 302 calls back, caller 302 may be moved to the front of the line in call queue 312. Consequently, caller 302 would be the next caller to speak to operator 308.

Configurable criteria 314 may also include a rule for assigning a priority ranking value based upon the customer's information. For instance, caller 302 may be considered a preferred customer, and thus, each time caller 302 calls the automated telephone system, caller 302 is automatically assigned a higher priority ranking value and thus not required to wait to speak to operator 308 for the same amount of time as the other, non-preferred callers. Caller 302's preferential status may be determined by referencing a customer database containing customer information which is automatically included in every call record created.

A call may be given a higher priority ranking value than previously received calls based upon any criteria distinguishing one caller from another. For example, in one embodiment, a caller may be given a higher priority ranking value if the caller calls from a number that has been identified as a higher priority phone number. The phone number may be higher priority because the number is associated with a preferred customer, or because it contains an area code that has been determined to be an area code with the greatest number of potential customers or preferred customers.

Additionally, configurable criteria 314 may provide instructions to assign higher priorities to callers who have reached a certain stage of the automated telephone system. For example, an automated telephone system may be implemented in order to browse merchandise, receive orders for merchandise, and to pay for the ordered merchandise. Configurable criteria 314 may specify that any calls that were disconnected in the billing stage should be given the highest priority ranking value to ensure that the transfer of money was completed.

In another embodiment, configurable criteria 314 may include a rule for assigning priority ranking value to a caller whose call was prematurely terminated because of the occurrence of an error, regardless of the stage at which the error occurred. For example, prioritization logic 304 may automatically update a call record with an error notice in the event that prioritization logic 304 determines that the automated telephone system encountered an unrecoverable error that required the system to restart. The error notice may correlate to a higher priority ranking value to allow any caller with the error notice in a corresponding call record to be placed in a more advanced position in call queue 312 after the caller calls back. In another example, an operator can manually update a call record to display an error notice in the event that operator error may have resulted in a premature disconnection of a call, such as in the event where an operator inadvertently hangs up on a caller or transfers the caller to the wrong department. Furthermore, an operator can update a call record to display an error notice if a caller has indicated to the operator that one or more of the caller's previous calls was prematurely disconnected.

In the illustrative embodiment depicted in FIG. 3, caller 302 can represent one or more callers. Similarly, operator 308 can represent one or more operators. In addition, call queue 312 may also represent one or more call queues, each of which may correspond to one or more stages within an automated telephone system.

Figure 4:
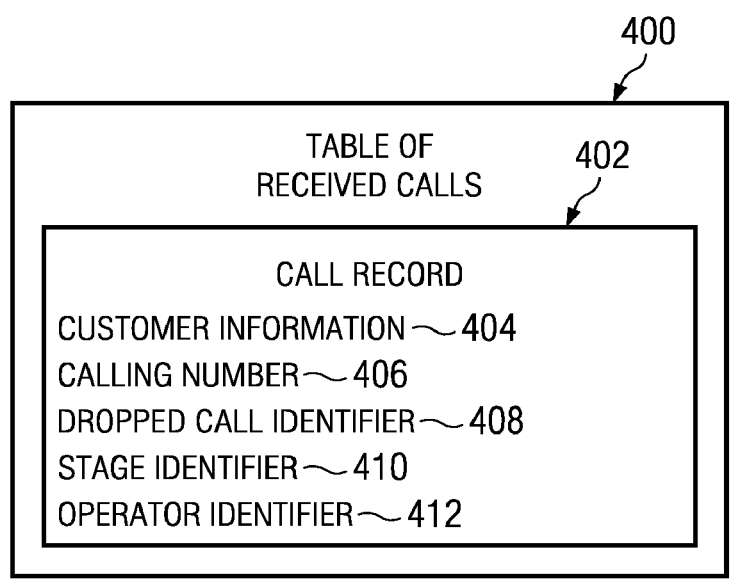
FIG. 4 is a table of received calls for use in prioritizing a call in accordance with an illustrative embodiment.

Turning now to FIG. 4, a block diagram of a table of received calls is depicted in accordance with an illustrative embodiment. In this illustrative embodiment of FIG. 4, table of received calls 400 is a table of received calls, such as table of received calls 310 of FIG. 3.

A logic component, such as prioritization logic 304 in FIG. 3, populates table of received calls 400 with one or more call records, such as call record 402. Call record 402 includes information to enable a software component, such as prioritization logic 304, to locate a record of a prematurely disconnected call, such as call record 402, in table of received calls 400. In one embodiment, prioritization logic may create call record 402 when a caller first places a call to an automated telephone system. Thus, if the caller is later prematurely disconnected, prioritization logic can reference call record 402 to identify a prematurely terminated call and to prioritize a second call from the caller.

The information contained within table of received calls 400 may include, for example, customer information 404. Customer information 404 may contain such information as the caller's name, address, account number, social security number, or any other similar information in order to identify each unique caller. Customer information 404 may also include information identifying the status of the customer for later use in prioritizing a prematurely terminated call. For example, if the caller is also a preferred customer, then customer information 404 may indicate that the caller's status is "preferred". Thus, a preferred customer would be allowed to move to the front of a call queue if customer status is a criterion by which calls are prioritized. The preferred customer could be moved to the front of any call queue when the preferred customer's call is first received or after the caller has called back after having been prematurely disconnected from the first call.

In addition, call record 402 may also contain calling number 406, which is the phone number of the phone from which the caller placed the call to the automated telephone system. Calling number 406 may be used in conjunction with customer information 404 to identify each unique caller as in the instance where members of the same household may be calling from the same phone number.

Call record 402 may also contain dropped call identifier 408. Dropped call identifier 408 is any identifier that may indicate that the call to which call record 402 relates has been prematurely disconnected in the past. Dropped call identifier 408 can be, for example, a symbol, number, letter, character, string of text, or any combination thereof whose presence indicates that the call from which call record 402 was generated was a prematurely disconnected call. For example, dropped call identifier 408 may be a symbol of a flag where the flag indicates that the call was prematurely disconnected. In another illustrative embodiment, dropped call identifier may be, for example, the phrase, "prematurely terminated", or the letter "X", where "X" indicates that the call was prematurely terminated. In addition, dropped call identifier 408 may contain the priority ranking value for use in prioritizing a prematurely terminated call.

Stage identifier 410 is any identifier that may indicate the stage at which the prematurely disconnected call was at when the call was terminated. Stage identifier 410 may be any symbol, number, letter, character, string of text, or combination thereof. For example, if a caller to an automated telephone system navigated through the call menu options and ended up in a queue of calls to wait to speak to an operator in the billing department, then stage identifier 410 may be the phrase "Billing Department". As used herein, the term "stage" refers to one of the various departments or divisions accessible to a caller of an automated telephone system.

Each stage may have one or more separate call queues. For instance, in another example, a caller placing a call to an automated telephone system for booking a flight may be directed to a first stage where the caller is required to provide personal information to create an account. In this account creation stage, the caller may create an account by providing an operator with information used to create customer information 404. During this process, the caller may be required to wait in a call queue in order to speak with an airlines representative. Subsequently, the caller may be directed to a separate stage in order to make the airline reservation by selecting a destination and travel dates. Similarly, the caller may be required to wait in a call queue in order to speak with a different airlines representative. Finally, the caller may be directed to a third stage in order to provide billing information, such as a credit card number, billing address, and other billing-related information. In this example, the three different stages through which the caller was required to proceed may be assigned identifiers, such as "account creation", "reservations", and "billing" in stage identifier 410. Thus, if a caller is prematurely disconnected after having created an account, but before making the actual airline reservation, stage identifier 410 may consist of the word "reservation."

Call record 402 may also include operator identifier 412 that indicates which operator was responsible for assisting the caller. Operator identifier 412 may be, for example, a symbol, number, letter, character, string of text, or any combination thereof. For example, operator identifier 412 may be the name of the operator or the operator's employee identification number. In one embodiment, operator identifier 412 is used to route a prematurely terminated call back to the operator who was originally assisting the caller.

With the information contained in call record 402, a component of an automated telephone system, such as prioritization logic 304 of FIG. 3, is capable of identifying a prematurely disconnected call and placing the prematurely disconnected call in the proper stage and in the same or similar position in a call queue that the caller was in before the caller's first call was prematurely disconnected. The prioritization logic identifies a prematurely terminated call by searching table of received calls 400 for a call record containing information that corresponds to a second call from the same user.

Call record 402 may also be used to generate statistics about how often calls are being dropped, at what stage the calls are being dropped, and which operator, if any, was responsible for assisting the caller when the initial call was prematurely disconnected. In this manner, an administrator of the automated telephone system can identify problems with the automated telephone system or with certain operators.

Although table of received calls 400 contains only a single call record, call record 402, table of received calls 400 may be populated with more than one call record. In order to limit the number of call records, call records may be periodically purged from table of received calls 400. For example, if after the initial call was prematurely disconnected, the caller fails to call back within a predefined period of time, then the call record is purged from table of received calls 400. Additionally, call record 402 may contain more or fewer categories of information than the entries depicted in FIG. 4.

Figure 5:
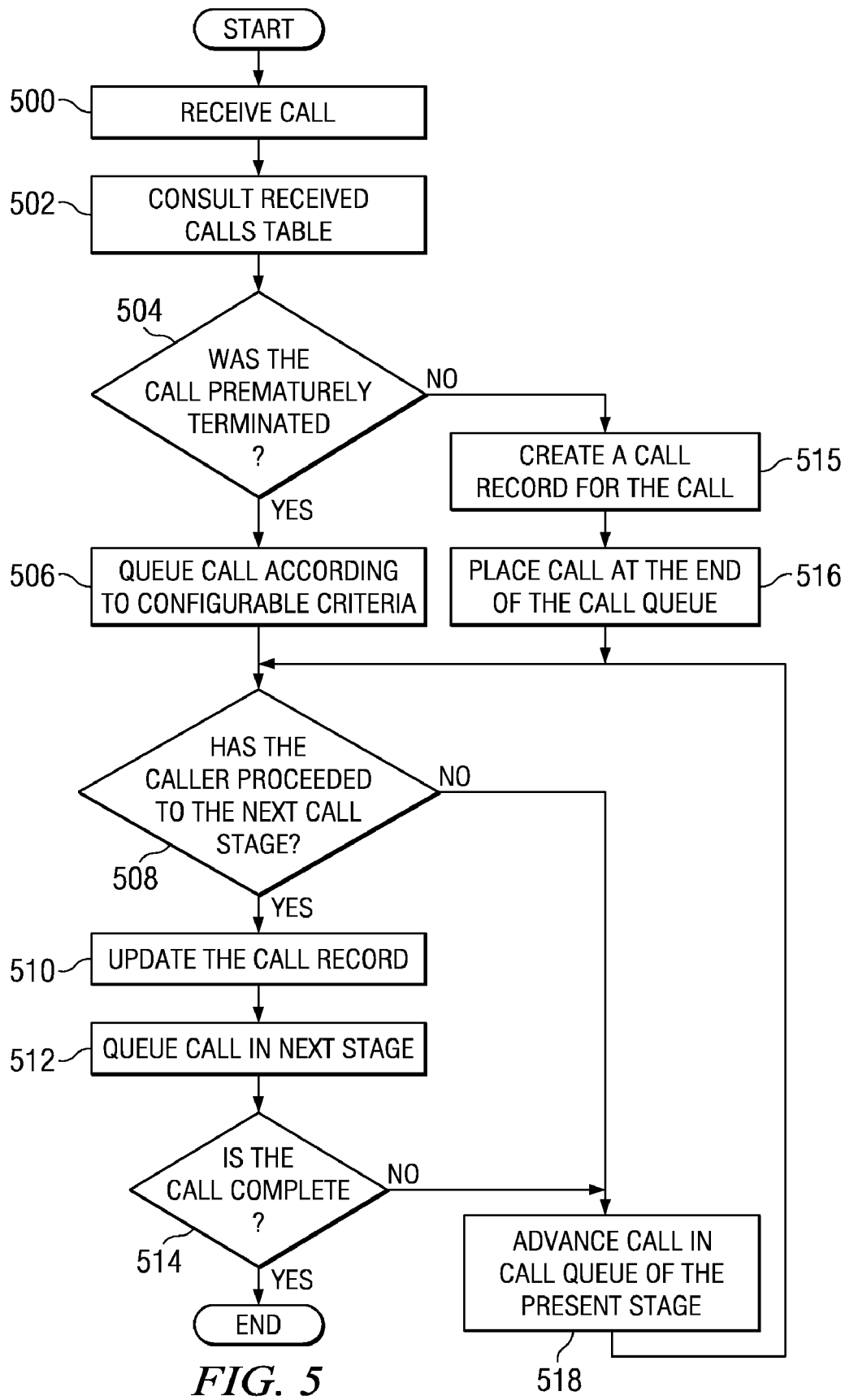
FIG. 5 is a flowchart of a process for prioritizing a call in accordance with an illustrative embodiment.

Turning now to FIG. 5, a flowchart of a process for prioritizing a call is depicted in accordance with an illustrative embodiment. In this illustrative embodiment of FIG. 5, the process may be performed by a software component, such as prioritization logic 304 of FIG. 3.

The process begins by receiving a call (step 500). The process then consults a received calls table (step 502). By referencing the received calls table, the process is able to make the determination as to whether the call was prematurely terminated (step 504). If the process makes the determination that the call was prematurely terminated by locating a call record corresponding to the newly received call (yes output to step 504), then the process queues the call in a call queue according to configurable criteria (step 506).

The process then makes a determination as to whether the caller has proceeded to the next call stage (step 508). If the process makes the determination that the caller has proceeded to the next stage (yes output to step 508), then the process updates the call record (step 510) and queues the call in the call queue of the next stage (step 512).

The process then makes the determination as to whether the call is complete (step 514). If the call is complete (yes output to step 514), then the process terminates thereafter.

Returning now to step 504, if the process makes the determination that the call was not prematurely terminated (no output to step 504), then the process creates a call record for the call (step 515). Thereafter, the process places the call at the end of the call queue (step 516), and the process continues to step 508.

Returning now to step 508, if the process makes the determination that the call has not proceeded to the next call stage (no output to step 508), then the process advances the call in the call queue of the present stage (step 518) and the process returns to step 508.

Returning now to step 514, if the process makes the determination that the call is not complete (no output to step 514), then the process continues to step 518.

The illustrative embodiments described herein provide a method, an apparatus, and a computer usable program product for managing received calls. In response to receiving a first call from a user, the process stores a record of the first call in a table of received calls. Thereafter, in response to receiving a second call from the user within a predefined period of time after the first call was prematurely disconnected, the process identifies a second call as a prematurely terminated call. The process then places the prematurely terminated call in a queue of calls according to a set of configurable criteria and updates the record of the first call with a progress of the prematurely terminated call. Using the different embodiments described above, a user who called an automated telephone system, and who was prematurely disconnected before completing the desired transaction, can call back a second time, within a predefined period of time, and be automatically directed back to the same stage and/or place in a call queue.

Consequently, the caller is not required to duplicate the navigation of the menu options or assume a place at the end of the call queue. Additionally, the call record created upon receipt of the first call can be used in order to diagnose potential problems within an automated telephone system, such as the stages or operators from which an unacceptable number of dropped calls originated.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing received calls, the computer implemented method comprising:
   responsive to receiving a first call from a user, storing a record of the first call in a table of received calls and placing the first call in a queue of calls;
   responsive to receiving a second call from the user within a predefined period of time after the first call was prematurely disconnected, identifying the second call as a prematurely terminated call;
   determining a length of time the first call was in the queue of calls;
   responsive to determining the length of time, placing the prematurely terminated call in a position in the queue of calls based on the length of time the first call was in the queue of calls; and
   updating the record of the first call with a progress of the prematurely terminated call.

2. The computer implemented method of claim 1, wherein placing the prematurely terminated call in the position in the queue of calls further comprises:
   determining a current wait time for calls in the queue of calls to be connected to an operator; and
   selecting the position for the prematurely terminated call in the queue of calls based on the current wait time.

3. The computer implemented method of claim 1, wherein the step of updating the record of the first call with the progress of the prematurely terminated call further comprises at least one of identifying a stage at which the first call was prematurely disconnected and identifying an operator with whom the user was speaking at the time the first call was prematurely disconnected.

4. The computer implemented method of claim 1, wherein the step of updating the record of the first call with the progress of the prematurely terminated call further comprises:
   assigning a priority ranking value to the record based on the time the first call was in the queue of calls and based on a status of the user as a preferred customer.

5. The computer implemented method of claim 1, wherein the record of the first call further comprises the user's information, the user's calling number, a dropped call identifier, a stage identifier, and an employee identifier.

6. The computer implemented method of claim 1 further comprising:
   identifying a status of the user as a preferred customer;
   wherein placing the prematurely terminated call in the position in the queue of calls further comprises:
   placing the prematurely terminated call in the position in the queue of calls based on the status of the user as the preferred customer.

7. A computer program product comprising:
   a computer readable storage device including computer usable program code for managing received calls, the computer program product comprising:
   computer usable program code for storing a record of the first call in a table of received calls in response to receiving a first call from a user and placing the first call in a queue of calls;

computer usable program code for identifying a second call as a prematurely terminated call in response to receiving the second call from the user within a predefined period of time after the first call was prematurely disconnected;

computer usable program code for determining a length of time the first call was in the queue of calls;

computer usable program code for placing the prematurely terminated call in a position in the queue of calls based on the length of time the first call was in the queue of calls in response to determining the length of time; and computer usable program code for updating the record of the first call with a progress of the prematurely terminated call.

8. The computer program product of claim 7, wherein placing the prematurely terminated call in the position in the queue of calls further comprises:

determining a current wait time for calls in the queue of calls to be connected to an operator; and selecting the position for the prematurely terminated call in the queue of calls based on the current wait time.

9. The computer program product of claim 7, wherein the computer usable program code for updating the record of the first call with the progress of the prematurely terminated call further comprises computer usable program code for at least one of identifying a stage at which the first call was prematurely disconnected and identifying an operator with whom the user was speaking at the time the first call was prematurely disconnected.

10. The computer program product of claim 7, wherein the computer usable program code for updating the record of the first call further comprises:

computer usable program code for assigning a priority ranking value to the call record based on the time the first call was in the queue of calls and based on a status of the user as a preferred customer.

11. The computer program product of claim 7, wherein the record of the first call further comprises the user's information, the user's calling number, a dropped call identifier, a stage identifier, and an employee identifier.

12. A system for managing received calls, the system comprising:

a memory for storing at least one of a table of received calls, a call queue, and a set of configurable criteria; and a processor unit configured to execute computer program code including prioritization logic for storing a record of a first call in a table of received calls and placing the first call in a queue of calls in response to receiving the first call from a user; identifying a second call as a prematurely terminated call in response to receiving the second call from the user within a predefined period of time after the first call was prematurely disconnected; determining a length of time the first call was in the queue of calls; placing the prematurely terminated call in a position in the queue of calls based on the length of time the first call was in the queue of calls in response to determining the length of time; and updating the record of the first call with a progress of the prematurely terminated call.

\* \* \* \* \*